(12) United States Patent
Gonzalez et al.

(10) Patent No.: US 8,277,097 B1
(45) Date of Patent: Oct. 2, 2012

(54) BICYCLE FOG LIGHT SYSTEM

(76) Inventors: Kelvin Gonzalez, Miami, FL (US);
Evelyn Pichardo-Gonzalez, Miami, FL (US)

( * ) Notice: Subject to any disclaimer, the term of this patent is extended or adjusted under 35 U.S.C. 154(b) by 313 days.

(21) Appl. No.: 12/653,055

(22) Filed: Dec. 8, 2009

(51) Int. Cl.
*B62J 6/00* (2006.01)
*F21L 4/02* (2006.01)

(52) U.S. Cl. .......................... 362/473; 362/86; 362/190

(58) Field of Classification Search .......... 362/473–476, 362/86, 190, 191
See application file for complete search history.

(56) References Cited

U.S. PATENT DOCUMENTS

| | | | |
|---|---|---|---|
| 5,014,168 A * | 5/1991 | Kelly | 362/86 |
| 5,121,305 A * | 6/1992 | Deed et al. | 362/473 |
| 5,800,039 A * | 9/1998 | Lee | 362/473 |
| 6,059,431 A * | 5/2000 | Ellis, Jr. | 362/500 |
| 6,072,386 A * | 6/2000 | Yu | 340/432 |
| 6,265,984 B1 * | 7/2001 | Molinaroli | 340/815.4 |
| 6,492,963 B1 * | 12/2002 | Hoch | 345/39 |
| 7,063,391 B2 * | 6/2006 | Peng | 301/37.41 |
| 7,976,048 B2 * | 7/2011 | Bartolome Garcia et al. | 280/288.4 |

* cited by examiner

*Primary Examiner* — Alan Cariaso

(57) ABSTRACT

An LED light system which attaches to the wheel axle of a bicycle or other vehicle and includes a horn, a controller to store different horn tones and light sequences, a rechargeable power source, and means to activate and deactivate the light and horn separately. A housing has a vertically oriented support plate. A row of light emitting diodes is secured to the support plate. A speaker is secured to one end of the support plate. Electrical elements are provided within the housing. The electrical elements include a controller. The controller has at least one port operatively coupled to the controller. The controller has a potential source powering the controller and the light emitting diodes and the speaker. The controller has means for activating and inactivating the light emitting diodes and the speaker. An attachment component is provided. In this manner the system is secured to a recipient member.

2 Claims, 3 Drawing Sheets

US 8,277,097 B1

BICYCLE FOG LIGHT SYSTEM

BACKGROUND OF THE INVENTION

Field of the Invention

The present invention relates to a bicycle or other vehicle fog light system and more particularly pertains to removably positioning a source of illumination and an audio alarm on a forward or rearward region of a bicycle for safety purposes, the positioning being in a safe, convenient and economical manner.

SUMMARY OF THE INVENTION

In view of the foregoing disadvantages inherent in the known types of bicycle light systems of known designs and configurations now present in the prior art, the present invention provides an improved bicycle fog light system. As such, the general purpose of the present invention, which will be described subsequently in greater detail, is to provide a new and improved bicycle fog light system and method which has all the advantages of the prior art and none of the disadvantages.

To attain this, the present invention essentially comprises a bicycle fog light system. First provided is a housing. The housing is in a generally rectilinear configuration. The housing has a rectangular, vertically oriented rear plate. The rear plate has a top edge. The rear plate has a bottom edge. The rear plate has parallel side edges. The housing has a rectangular, horizontally oriented bottom plate. The bottom plate extends forwardly from the bottom edge of the rear plate. The bottom plate has a forward edge. The bottom plate has parallel side edges. The bottom plate has a rearward edge. The rearward edge is coextensive with the bottom edge of the rear plate. The housing having two parallel, generally rectangular, vertically oriented side plates. The side plates extend forwardly from the side edges of the rear plate and upwardly from the side edges of the bottom plate. The side plates each have a forward edge. The side plates each have a parallel rearward edge. The side plates each have a bottom edge. The side plates each have a top edge. The top edges of the side plates extend from the side edges of the rear plate at a downward angle.

A transparent cover plate is provided. The cover plate has an inverted L-shaped configuration. The cover plate has a rectangularly shaped, vertically oriented major portion. The major portion extends between the forward edges of the bottom plate and side plates. The cover plate has a rectangularly shaped, generally horizontally oriented minor portion. The minor portion extending between the top edges of the side plates and the back plate.

Provided next is a generally rectilinear chamber. The chamber is formed between the housing and the cover.

A vertically oriented support plate is provided next. The support plate is secured within the chamber between the side panels. In this manner the chamber is divided into a forward section and a rearward section. A row of vertically aligned light emitting diodes is provided. The diodes are secured to the support plate within the forward section. A speaker is provided. The speaker is adapted to emit a warning sound. The speaker is secured to the support plate beneath the light emitting diodes within the forward section.

Further provided are electrical elements. The electrical elements are provided within the rearward section. The electrical elements include a central controller. The central controller has a USB port. In this manner the battery is adapted to be charged and audio data may be uploaded. The central controller also has a reader port. In this manner a memory card may be received. The USB port and the reader port are operatively coupled to the controller. A battery is provided. The battery powers the controller and the light emitting diodes and the speaker. A first button is provided. In this manner the light emitting diodes may be activated and inactivated. A second button is provided. The second button is adapted to be positioned at any location such as the handlebars for the convenience of a user. In this manner the speakers may be coupled by wires or wireless for being activated and inactivated.

Provided last is an attachment component. The attachment component includes a rectangular plate. The rectangular plate is secured to and depends from the rear plate of the housing. The attachment component also includes a generally circular plate. The circulate plate is secured to and depends from the rectangular plate. The generally circular plate has an arcuate opening. A bicycle is provided. The bicycle has an axle. The arcuate opening extends between 7 o'clock and 11 o'clock. In this manner the system may be secured to the axle of the bicycle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bicycle fog light system which has all of the advantages of the prior art bicycle light systems of known designs and configurations and none of the disadvantages.

It is another object of the present invention to provide a new and improved bicycle fog light system which may be easily and efficiently manufactured and marketed.

It is further object of the present invention to provide a new and improved bicycle fog light system which is of durable and reliable constructions.

An even further object of the present invention is to provide a new and improved bicycle fog light system which is susceptible of a low cost of manufacture with regard to both materials and labor, and which accordingly is then susceptible of low prices of sale to the consuming public, thereby making such bicycle fog light system economically available to the buying public.

Even still another object of the present invention is to provide a bicycle fog light system for removably positioning a source of illumination and an audio alarm on a forward or rearward region of a bicycle or other vehicle for safety purposes, the positioning being in a safe, convenient and economical manner.

Lastly, it is an object of the present invention to provide a new and improved bicycle fog light system. A housing has a vertically oriented support plate. A row of light emitting diodes is secured to the support plate. A speaker is secured to one end of the support plate. Electrical elements are provided within the housing. The electrical elements include a controller. The controller has at least one port operatively coupled to the controller. The controller has a potential source powering the controller and the light emitting diodes and the speaker. The controller has means for activating and inactivating the light emitting diodes and the speaker. An attachment component is provided. In this manner the system is secured to a recipient member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
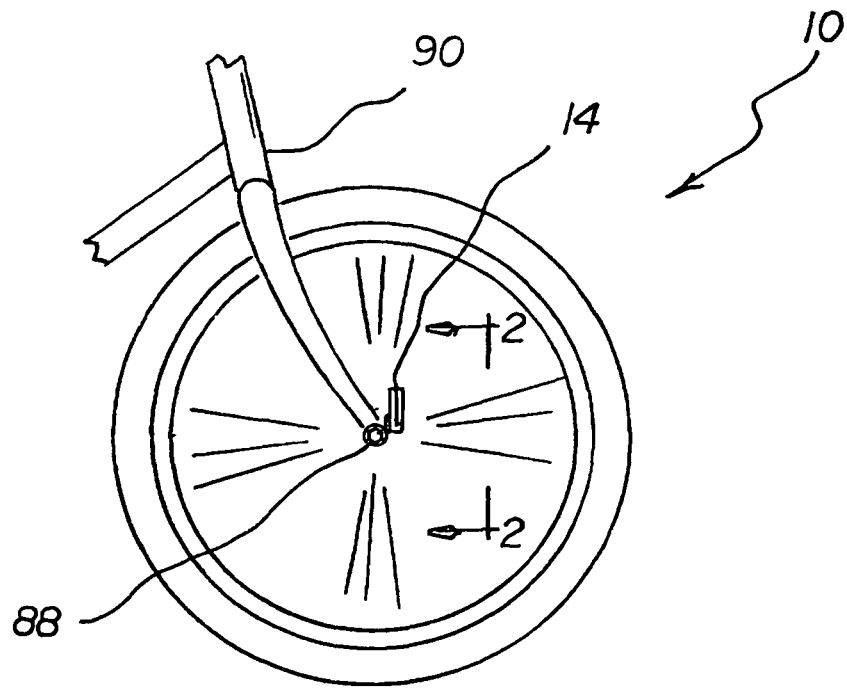
FIG. 1 is a side elevational view of a bicycle fog light system constructed in accordance with the principles of the present invention.
Figure 2:
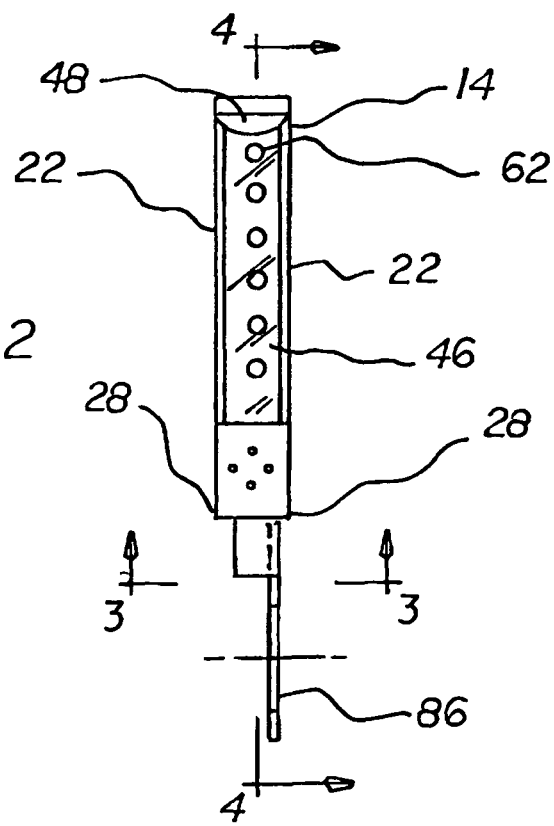
FIG. 2 is a front elevational view of the system taken along line 2-2 of FIG. 1.
Figure 3:
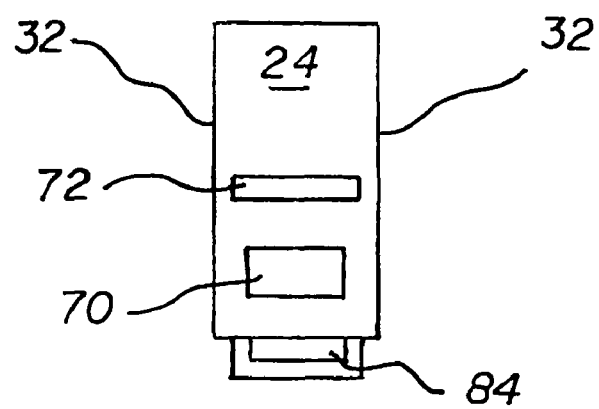
FIG. 3 is a bottom view of the system taken along line 3-3 of FIG. 2.
Figure 4:
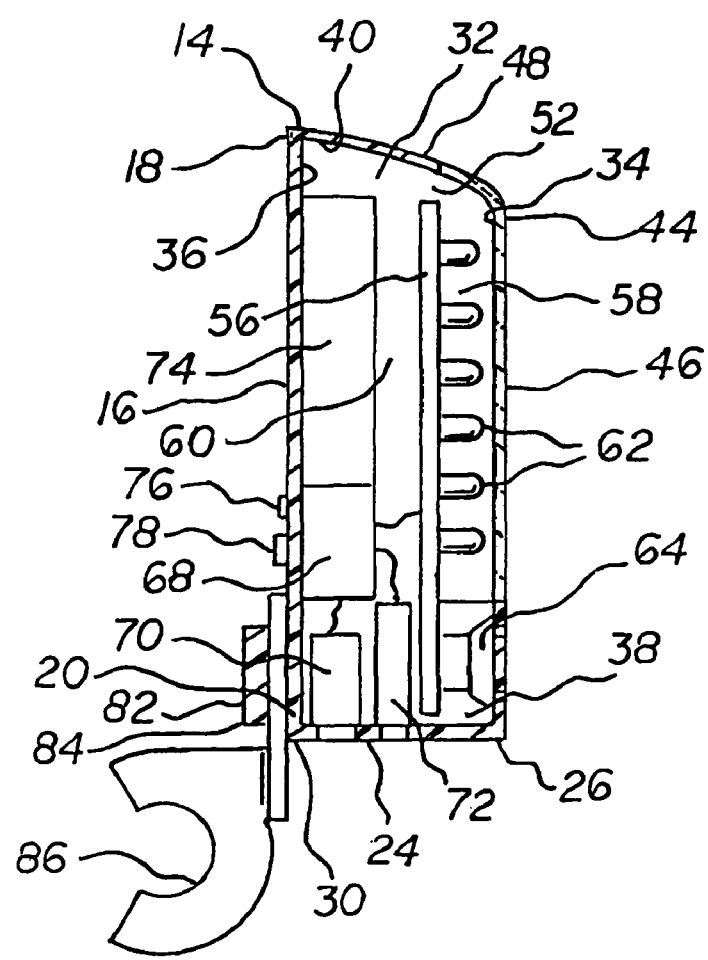
FIG. 4 is a cross sectional view taken along line 4-4 of FIG. 3.

With reference now to the drawings, and in particular to FIG. 1 thereof, the preferred embodiment of the new and improved bicycle fog light system embodying the principles and concepts of the present invention and generally designated by the reference numeral 10 will be described.

The present invention, the bicycle fog light system 10 is comprised of a plurality of components. Such components in their broadest context include a housing, electrical components and an attachment component. Such components are individually configured and correlated with respect to each other so as to attain the desired objective.

First provided is a housing 14. The housing is in a generally rectilinear configuration. The housing has a rectangular, vertically oriented rear plate 16. The rear plate has a top edge 18. The rear plate has a bottom edge 20. The rear plate has parallel side edges 22. The housing has a rectangular, horizontally oriented bottom plate 24. The bottom plate extends forwardly from the bottom edge of the rear plate. The bottom plate has a forward edge 26. The bottom plate has parallel side edges 28. The bottom plate has a rearward edge 30. The rearward edge is coextensive with the bottom edge of the rear plate. The housing having two parallel, generally rectangular, vertically oriented side plates 32. The side plates extend forwardly from the side edges of the rear plate and upwardly from the side edges of the bottom plate. The side plates each have a forward edge 34. The side plates each have a parallel rearward edge 36. The side plates each have a bottom edge 38. The side plates each have a top edge 40. The top edges of the side plates extend from the side edges of the rear plate at a downward angle.

A transparent cover plate 44 is provided. The cover plate has an inverted L-shaped configuration. The cover plate has a rectangularly shaped, vertically oriented major portion 46. The major portion extends between the forward edges of the bottom plate and side plates. The cover plate has a rectangularly shaped, generally horizontally oriented minor portion 48. The minor portion extending between the top edges of the side plates and the back plate.

Provided next is a generally rectilinear chamber 52. The chamber is formed between the housing and the cover.

A vertically oriented support plate 56 is provided next. The support plate is secured within the chamber between the side panels. In this manner the chamber is divided into a forward section 58 and a rearward section 60. A row of vertically aligned light emitting diodes 62 is provided. The diodes are secured to the support plate within the forward section. A speaker 64 is provided. The speaker is adapted to emit a warning sound. The speaker is secured to the support plate beneath the light emitting diodes within the forward section.

Further provided are electrical elements. The electrical elements are provided within the rearward section. The electrical elements include a central controller 68. The central controller has a USB port 70. In this manner the battery is adapted to be charged and audio data may be uploaded. The central controller also has a reader port 72. In this manner a memory card may be received. The USB port and the reader port are operatively coupled to the controller. A battery 74 is provided. The battery powers the controller and the light emitting diodes and the speaker. A first button 76 is provided. In this manner the light emitting diodes may be activated and inactivated. A second button 78 is provided. In this manner the speakers may be activated and inactivated.

Provided last is an attachment component 82. The attachment component includes a rectangular plate 84. The rectangular plate is secured to and depends from the rear plate of the housing. The attachment component also includes a generally circular plate 86. The circulate plate is secured to and depends from the rectangular plate. The generally circular plate has an arcuate opening. A bicycle 90 is provided. The bicycle has an axle 88. The arcuate opening extends between 7 o'clock and 11 o'clock. In this manner the system may be secured to the axle of the bicycle.

Figure 5:
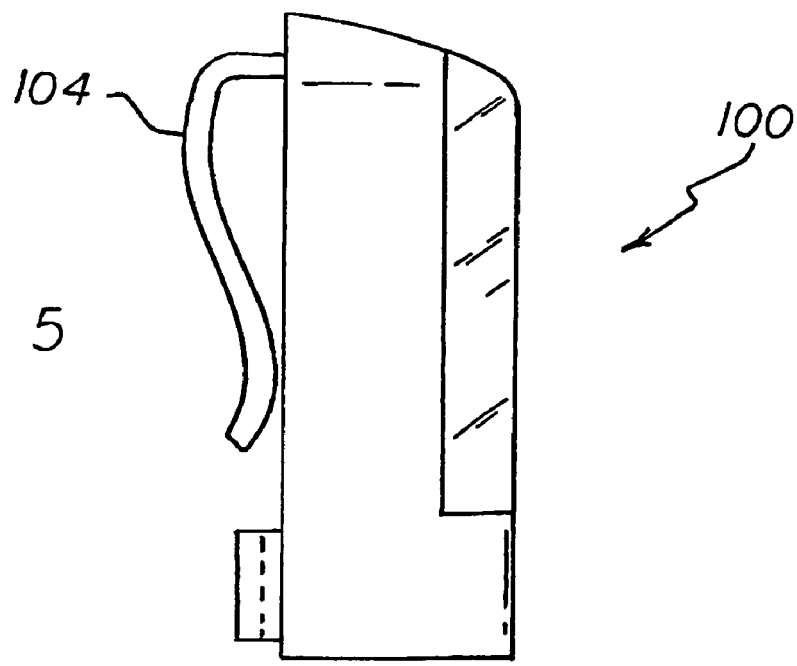
FIG. 5 is a side elevational view of a bicycle fog light constructed in accordance with an alternate embodiment of the invention.
Figure 6:
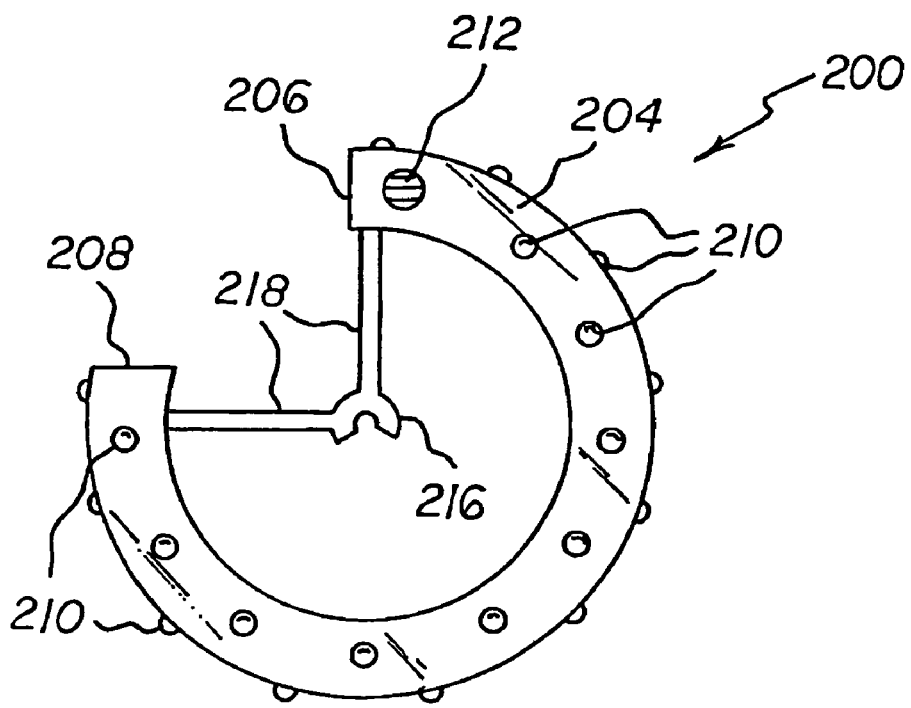
FIG. 6 is a side elevational view of a bicycle fog light constructed in accordance with a final alternate embodiment of the invention.

Reference is now made to the alternate embodiment 100 of the invention illustrated in FIG. 5. An attachment component 104 is provided. The attachment component is spring metal. The attachment component is in an inverted U-shaped configuration. All other components are the same as in the previously described embodiment Reference is now made to the additional alternate embodiment 200 of the invention illustrated in FIG. 6. A support plate 204 is provided. The support plate is in a generally circular configuration. The support plate extends between a 12 o'clock position 206 and a 9 o'clock position 208. A plurality of light emitting diodes 210 are provided. The diodes are in an arcuate configuration. A speaker 212 is provided. The speaker is provided adjacent to the 12 o'clock position. The recipient member is an axle of a bicycle. The attachment component includes a generally circular plate 216. The plate has an arcuate opening. The plate extends between a 4 o'clock position and an 8 o'clock position. In this manner the system is releasably secured to the axle of the bicycle. The system also includes a plurality of radial spokes 218. The spokes couple the support plate and the generally circular plate. All other components are the same as in the previously described embodiments.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle fog light system including:
    a housing having a vertically oriented support plate in a generally circular configuration extending between a 12 o'clock position and a 9 o'clock position;
    a row of light emitting diodes in an arcuate configuration secured to the support plate;
    a speaker secured to one end of the support plate adjacent to the 12 o'clock position;
    electrical elements within the housing including a controller with at least one port operatively coupled to the controller, a potential source powering the controller and the light emitting diodes and the speaker, means for activating and inactivating the light emitting diodes and the speaker; and
    an attachment component for securing the system to a recipient member.

2. A bicycle fog light system for removably positioning a source of illumination and an audio alarm on a forward region of a bicycle for safety purposes, the system including, in combination:
    a housing in a generally rectilinear configuration having a rectangular, vertically oriented rear plate, the rear plate having a top edge and a bottom edge and parallel side edges, the housing having a rectangular, horizontally oriented bottom plate extending forwardly from the bottom edge of the rear plate, the bottom plate having a forward edge and parallel side edges and a rearward edge coextensive with the bottom edge of the rear plate, the housing having two parallel, generally rectangular, vertically oriented side plates extending forwardly from the side edges of the rear plate and upwardly from the side edges of the bottom plate, the side plates each having a forward edge and a parallel rearward edge and a bottom edge and a top edge, the top edges of the side plates extending from the side edges of the rear plate at a downward angle;
    a transparent cover plate having an inverted L-shaped configuration, the cover plate having a rectangularly shaped, vertically oriented major portion extending between the forward edges of the bottom plate and side plates, the cover plate having a rectangularly shaped, generally horizontally oriented minor portion extending between the top edges of the side plates and the back plate;
    a generally rectilinear chamber formed between the housing and the cover;
    a vertically oriented support plate secured within the chamber between the side panels dividing the chamber into a forward section and a rearward section, a row of vertically aligned light emitting diodes secured to the support plate within the forward section, a speaker adapted to emit a warning sound, the speaker being secured to the support plate beneath the light emitting diodes within the forward section;
    electrical elements within the rearward section, the electrical elements including a central controller with a USB port for charging the battery and for uploading audio data and a reader port for a memory card, the USB port and the reader port operatively coupled to the controller, a battery powering the controller and the light emitting diodes and the speaker, a first button for activating and inactivating the light emitting diodes and a second button for activating and inactivating the speaker; and
    an attachment component including a rectangular plate secured to and depending from the rear plate of the housing, the attachment component also including a generally circular plate secured to and depending from the rectangular plate, the generally circular plate having an arcuate opening extending between 7 o'clock and 11 o'clock for releaseable securement of the system to an axle of a bicycle.

* * * * *